(12) United States Patent
Ko et al.

(10) Patent No.: US 10,926,926 B2
(45) Date of Patent: Feb. 23, 2021

(54) PACKING SHEET FOR DISCHARGING GAS AND FOOD CONTAINER INCLUDING THE SAME

(71) Applicants: Daesang Corporation, Seoul (KR); Yoon Sub Soh, Yongin-si (KR)

(72) Inventors: Hye Kyoung Ko, Seoul (KR); Yoon Sub Soh, Yongin-si (KR)

(73) Assignees: DAESANG CORPORATION; Yoon Sub Soh

( * ) Notice: Subject to any disclaimer, the term of this patent is extended or adjusted under 35 U.S.C. 154(b) by 24 days.

(21) Appl. No.: 16/366,707

(22) Filed: Mar. 27, 2019

(65) Prior Publication Data
US 2020/0024040 A1    Jan. 23, 2020

(30) Foreign Application Priority Data
Jul. 18, 2018   (KR) .................. 10-2018-0083535

(51) Int. Cl.
*B65D 51/16*   (2006.01)
*B65D 41/20*   (2006.01)
*B65D 41/62*   (2006.01)

(52) U.S. Cl.
CPC ......... *B65D 51/1616* (2013.01); *B65D 41/20* (2013.01); *B65D 41/62* (2013.01); *B32B 2307/724* (2013.01); *B32B 2307/7265* (2013.01); *B65D 2205/00* (2013.01); *B65D 2251/0015* (2013.01); *B65D 2251/0093* (2013.01)

(58) Field of Classification Search
CPC ............ B65D 51/1616; B65D 51/1611; B65D 51/1605; B65D 51/16; B65D 41/62; B65D 41/20; B65D 41/02

USPC ...... 220/372, 371, 367.1, 366.1, 359.3, 212; 215/261, 308, 307, 310, 228
See application file for complete search history.

(56) References Cited

U.S. PATENT DOCUMENTS 2,501,849 A * 3/1950 Krebs ............... B65D 41/14
                                             215/261
4,836,051 A * 6/1989 Guimbretiere ........ B60K 17/20
                                             475/230

(Continued)

FOREIGN PATENT DOCUMENTS

JP   H10152163      6/1998
JP   2003252363 A   9/2003

(Continued)

*Primary Examiner* — Robert J Hicks
(74) *Attorney, Agent, or Firm* — Myers Bigel, P.A.

(57) ABSTRACT

A packing sheet for discharging gas according to an exemplary embodiment of the present invention has a structure in which a first layer and a second layer, which are configured such that gas flows between one surface and the other surface, are stacked, and includes: a lamination portion which is formed by partially laminating the first layer and the second layer; and a gap portion which is a region other than a region of the lamination portion and has a space formed between the first layer and the second layer so that the gas flows in the space. According to the packing sheet for discharging gas, a space, in which gas may flow, is formed by partially laminating the first layer having fine bores and the second layer made of a gas-permeable waterproof material, and as a result, it is possible to prevent a liquid leakage while smoothly discharging the gas created in the container.

15 Claims, 7 Drawing Sheets

(56) References Cited

U.S. PATENT DOCUMENTS

| | | | | |
|---|---|---|---|---|
| 5,730,306 | A | * | 3/1998 | Costa ................. B65D 51/1616 |
| | | | | 215/261 |
| 5,934,494 | A | * | 8/1999 | Takahashi ............ B65D 51/244 |
| | | | | 206/204 |
| 7,381,453 | B2 | * | 6/2008 | Okhai .................... B32B 3/266 |
| | | | | 215/260 |
| 2003/0203183 | A1 | * | 10/2003 | Hester .................... B01D 61/00 |
| | | | | 428/315.5 |
| 2008/0083693 | A1 | | 4/2008 | Gottlieb et al. |
| 2016/0207006 | A1 | * | 7/2016 | Furuyama .............. H04R 1/023 |
| 2017/0190144 | A1 | * | 7/2017 | Ito .......................... B65D 65/40 |
| 2019/0144657 | A1 | * | 5/2019 | Henderson ........... C08K 5/0016 |
| | | | | 359/539 |

FOREIGN PATENT DOCUMENTS

| | | | |
|---|---|---|---|
| JP | 2005059857 | A | 3/2005 |
| JP | 2011514295 | | 5/2011 |
| JP | 2013184740 | A | 9/2013 |
| KR | 200367817 | | 11/2004 |
| KR | 1020080082782 | | 9/2008 |
| KR | 20140114685 | | 9/2014 |
| WO | 2004005153 | A1 | 1/2004 |

\* cited by examiner

PACKING SHEET FOR DISCHARGING GAS AND FOOD CONTAINER INCLUDING THE SAME

CROSS-REFERENCE TO RELATED APPLICATIONS

This application claims priority to and the benefit of Korean Patent Application No. 10-2018-0083535 filed in the Korean Intellectual Property Office on Jul. 18, 2018, the entire contents of which are incorporated herein by reference.

TECHNICAL FIELD

The present invention relates to a packing sheet for discharging gas and a food container including the same.

BACKGROUND ART

Taste of fermented food such as Kimchi may be easily spoiled when the fermented food comes into contact with air, and therefore, the fermented food is commercially distributed and sold in a state in which the fermented food is stored in a container with ensured leakproof sealability.

In the related art, in order to package contents such as Kimchi, the contents are sealed by inserting a packing sheet, which is formed by fusing a non-woven fabric into a foam packing sheet made of polyethylene or a foam sheet made of polyethylene, into an inner surface of a cover that corresponds to an opening of the container. However, in a case in which the food storing container is manufactured by considering only the leakproof sealability, there is a problem in that carbon dioxide gas, which is generated by microorganisms existing in the fermented food during a process of fermenting the food, is not appropriately discharged, and as a result, a packaged state is deformed due to the expansion of the container.

Therefore, the fermented food is sold in a state in which a gas absorbent capable of absorbing carbon dioxide is attached to the inner surface of the cover that seals the container. However, because the gas absorbent selectively absorbs only the carbon dioxide gas, nitrogen or oxygen gas included in air, which is introduced into the container while the container is repeatedly used by being opened and closed, remains in the container without being removed. Therefore, the gas absorbent is not considered as a solution for perfectly solving the problem of the deformation of the package.

There are problems in that the packing sheet and the gas absorbent in the related art cannot perfectly prevent a liquid leakage that occurs when the container sways or falls down during the process of transporting products, and particularly, the gas absorbent cannot perform its own function if the gas absorbent is immersed in Kimchi juice.

SUMMARY OF THE INVENTION

The present invention has been made in an effort to provide a packing sheet for discharging gas and a food container including the same, which are capable of preventing a liquid leakage while discharging gas created in the container to the outside.

An exemplary embodiment of the present invention provides a packing sheet for discharging gas which has a structure in which a first layer and a second layer, which are configured such that gas flows between one surface and the other surface, are stacked, the packing sheet including: a lamination portion which is formed by partially laminating the first layer and the second layer; and a gap portion which is a region other than a region of the lamination portion and has a space formed between the first layer and the second layer so that the gas flows in the space.

In the present exemplary embodiment, the first layer or the second layer may include a non-gas-permeable base material having a fine bore or include a gas-permeable base material.

In the present exemplary embodiment, the first layer may include a non-gas-permeable base material having a fine bore, and the second layer may include a gas-permeable base material.

In the present exemplary embodiment, the non-gas-permeable base material may be formed through a foaming process.

In the present exemplary embodiment, the gas-permeable base material of the second layer may have a waterproof property.

In the present exemplary embodiment, the lamination portion may include a sealing portion which is formed by continuously laminating any one of the first layer and the second layer on an outer circumference of the other of the first layer and the second layer.

In the present exemplary embodiment, the fine bore may be formed in a region of the first layer that corresponds to the region of the gap portion.

Another exemplary embodiment of the present invention provides a food container including: a main body which has therein an accommodation space for accommodating food and has an opening at one side thereof; a cover which is capable of opening or closing the opening; and the packing sheet for discharging gas according to any one of claims 1 to 7 which is disposed on a bottom surface of the cover. The packing sheet for discharging gas may be compressed against the opening to seal the main body while the cover closes the opening, the packing sheet may discharge gas in the main body, and the cover may include a discharge hole through which the gas, which is discharged through the packing sheet for discharging gas, is discharged to the outside.

In the exemplary embodiment of the present invention, the cover may have a flow groove that extends on a bottom surface thereof so as to form a flow path of gas, which is discharged from the packing sheet for discharging gas, by cooperating with a surface of the packing sheet for discharging gas which faces the cover.

In the exemplary embodiment of the present invention, the discharge hole may be formed in the flow groove so as to penetrate the cover.

According to the packing sheet for discharging gas according to the exemplary embodiment of the present invention, the space, in which the gas may flow, is formed by partially laminating the first layer having the fine bores and the second layer made of a gas-permeable waterproof material, and as a result, it is possible to prevent a liquid leakage while smoothly discharging the gas created in the container.

The food container according to the present exemplary embodiment includes the packing sheet for discharging gas which is provided on the bottom surface of the cover, and includes the flow grooves and the discharge hole which are formed by cooperating with the cover and allow the gas to flow and to be discharged therethrough, and as a result, it is possible to prevent expansion and deformation of the container caused by the gas by efficiently discharging the gas to the outside of the container.

According to the present exemplary embodiment, the sealing portion, which is formed along the outer circumference of any one of the first layer and the second layer, may prevent the liquid substance contained in the gap portion formed adjacent to the sealing portion from leaking to the outside.

DETAILED DESCRIPTION

Hereinafter, exemplary embodiments of the present invention will be described in more detail with reference to the accompanying drawings.

The present invention relates to a packing sheet 100 for discharging gas and a food container 200 including the packing sheet 100 which are used to prevent a liquid leakage while discharging gas in the container such as carbon dioxide gas created during a process in which microorganisms existing in fermented food ferment the food.

Figure 1:
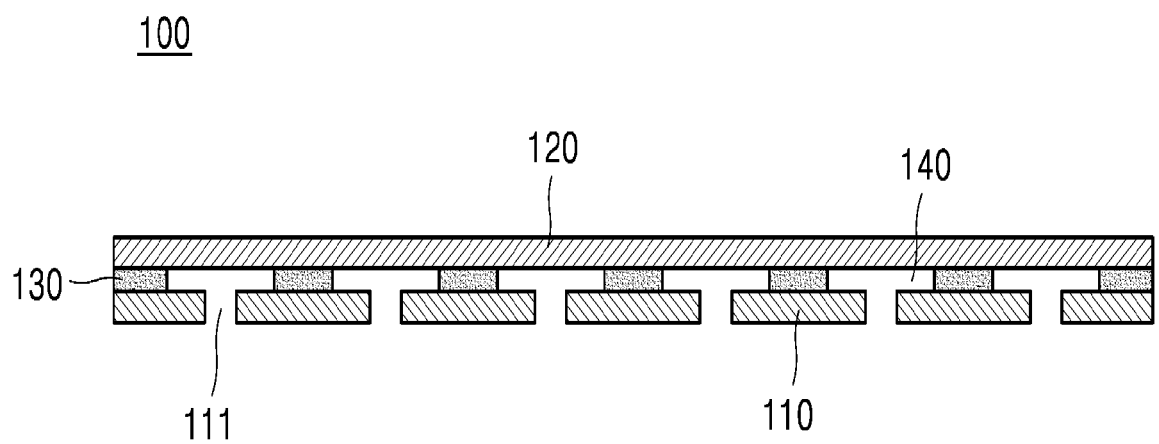
FIG. 1 is a view illustrating a stack structure of a packing sheet for discharging gas according to an exemplary embodiment of the present invention.
Figure 2A:
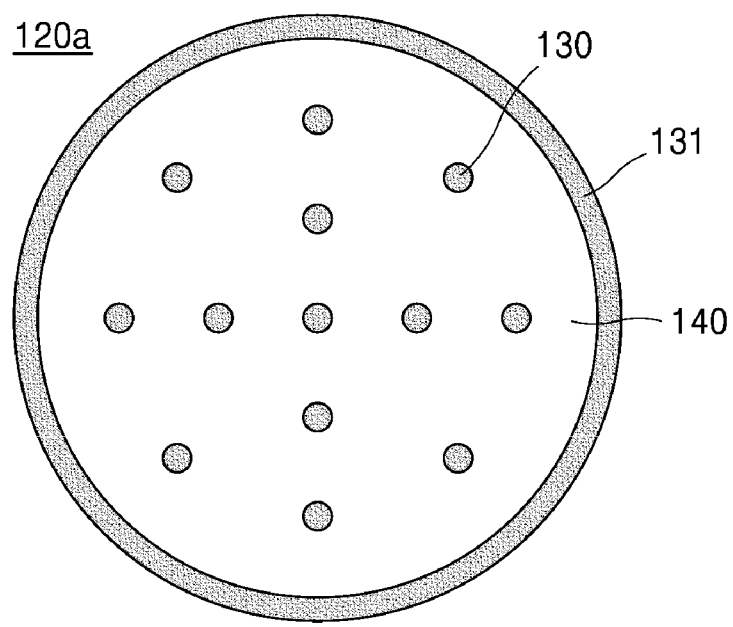
FIGS. 2A and 2B are views illustrating upper and lower portions of the packing sheet for discharging gas according to the exemplary embodiment of the present invention.
Figure 2B:
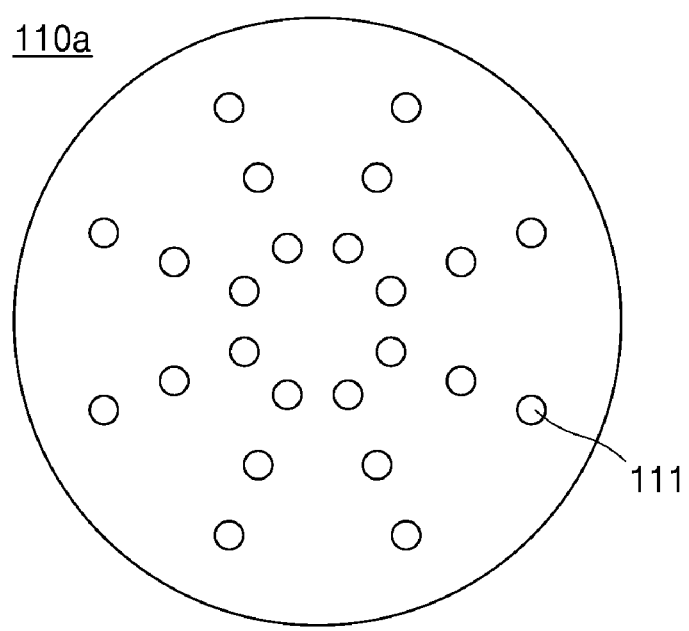
Figure 3A:
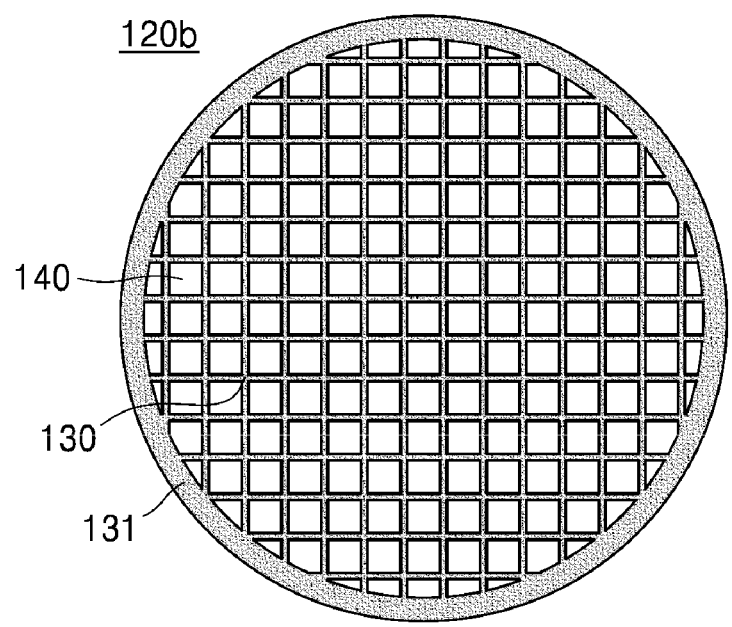
FIGS. 3A and 3B are views illustrating upper and lower portions of a packing sheet for discharging gas according to another exemplary embodiment of the present invention.
Figure 3B:
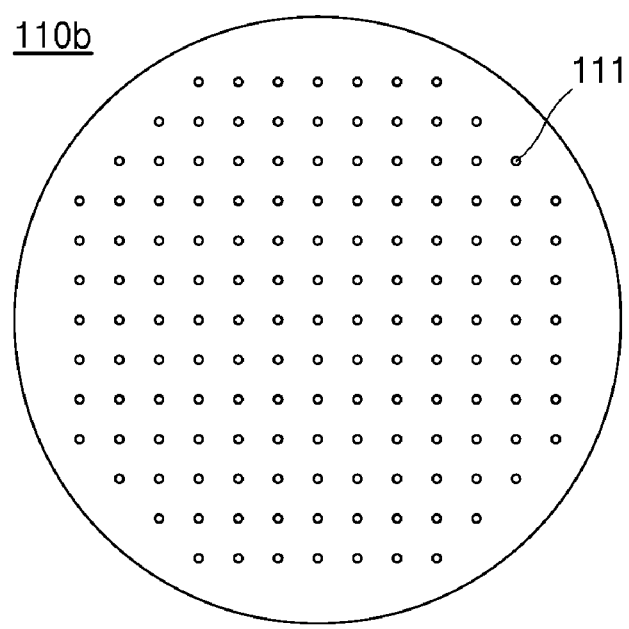
Figure 4:
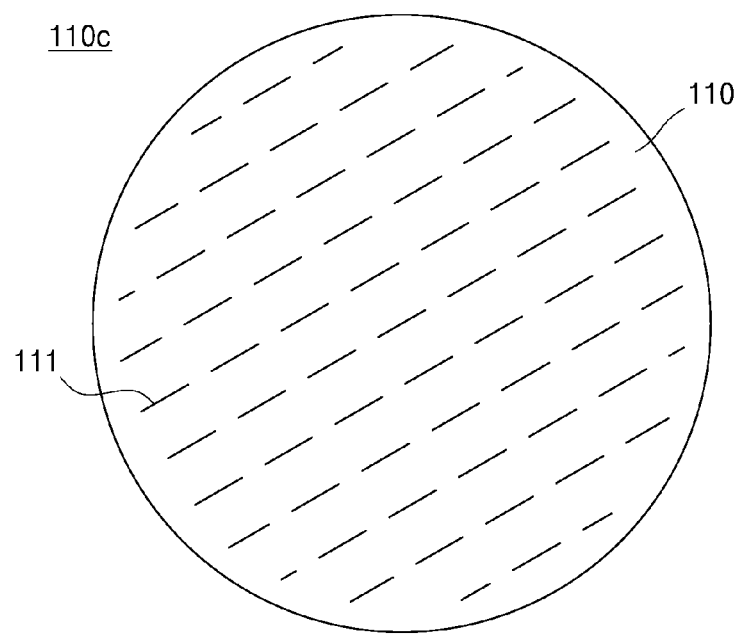
FIG. 4 is a view illustrating shapes of fine bores formed in a first layer according to another exemplary embodiment of the present invention.

FIG. 1 is a view illustrating a stack structure of a packing sheet for discharging gas according to an exemplary embodiment of the present invention, FIGS. 2A and 2B are views illustrating upper and lower portions of the packing sheet for discharging gas according to the exemplary embodiment of the present invention, FIGS. 3A and 3B are views illustrating upper and lower portions of a packing sheet for discharging gas according to another exemplary embodiment of the present invention, and FIG. 4 is a view illustrating shapes of fine bores formed in a first layer according to another exemplary embodiment of the present invention.

Referring to FIG. 1, the packing sheet 100 for discharging gas according to the exemplary embodiment of the present invention has a structure in which a first layer 110 and a second layer 120 are sequentially stacked so that gas may flow between one surface and the other surface, and the first layer 110 and the second layer 120 may be partially laminated.

The packing sheet 100 for discharging gas may be formed such that the first layer 110 and the second layer 120 are partially laminated. The packing sheet 100 for discharging gas may include lamination portions 130 which correspond to regions in which the first layer 110 and the second layer 120 are partially laminated, and a gap portion 140 which is a region other than the regions of the lamination portions 130 and has a space formed as the first layer 110 and the second layer 120 are spaced apart from each other. Since the lamination portion 130 is the region in which the first layer 110 and the second layer 120 are locally laminated and in close contact with each other, gas created in the container cannot move through the lamination portion 130. However, since the gap portion 140 is the region in which the first layer 110 and the second layer 120 are not laminated, the gas created in the container may flow through the gap portion 140.

The stacked first and second layers 110 and 120 may be made of different materials. For example, the first layer 110 or the second layer 120 may selectively include a non-gas-permeable base material or a gas-permeable base material, and the non-gas-permeable base material may include fine bores 111.

In the exemplary embodiment of the present invention, the first layer 110 includes the non-gas-permeable base material having the fine bores 111, and the second layer 120 includes the gas-permeable base material.

The first layer 110, which is the non-gas-permeable base material having the fine bores 111, may include a polyethylene base material generally used as a packing sheet, for example, and may be formed through a foaming process. The polyethylene foam, which is formed through the foaming process, has excellent water resistance and thus may have an effect of preventing a leakage of a liquid substance in the container.

The fine bores 111 may be formed in the first layer 110 including the polyethylene base material. The gas created in the container may penetrate through the fine bores 111 formed in the first layer 110. For example, carbon dioxide gas, which is created due to the fermentation process when fermented food is packaged in the container, may penetrate through the first layer 110.

The fine bore 111 may be formed to have a diameter or width of about 0.5 mm to 1 mm. As illustrated in FIGS. 3 and 4, the fine bore 111 may be formed in the form of a circular hole or a cut-out line. Alternatively, the fine bore 111 may be formed in other shapes other than the circular shape. In addition, the fine bores 111 may be formed at various intervals in an area of the first layer 110, and the number of fine bores 111 may be variously set. Meanwhile, the fine bore 111 formed in the first layer 110 may be sized such that the liquid substance does not easily penetrate through the fine bore 111, but the liquid substance may substantially penetrate through the fine bore 111.

The second layer 120 including the gas-permeable base material may have a waterproof property. Specifically, the second layer 120 may have the waterproof property as the gas-permeable base material, which constitutes the second layer 120, has the waterproof property or the gas-permeable base material is coated with a coating agent containing a substance having a waterproof performance. This configuration is made to prevent a liquid leakage by preventing the liquid substance, which penetrates through the fine bore 111 of the first layer 110, from penetrating through the second layer 120.

Since the base material included in the second layer 120 has gas permeability, the second layer 120 is not required to have the fine bore 111 for allowing gas to pass therethrough, unlike the first layer 110. Therefore, a separate bore forming process may not be performed.

A polyethylene non-woven fabric made of polyethylene may be used for the second layer 120 in order to ensure gas permeability, but the base material is not particularly limited as long as the base material has the gas permeability. The polyethylene non-woven fabric may be manufactured by compressing, with heat and pressure, fine fibers made of high-density polyethylene as a raw material. In detail, the polyethylene non-woven fabric may be formed by densely interlacing fine fibers having a thickness of 0.5 to 1 μm and then compressing the fine fibers with heat and pressure so that the liquid substance cannot penetrate therethrough, and as a result, the polyethylene non-woven fabric itself may have a waterproof performance.

Meanwhile, as described above, the packing sheet 100 for discharging gas according to the present invention may be manufactured in various ways so as to have the structure in which the first layer 110 and the second layer 120 are sequentially stacked and partially laminated.

For example, the packing sheet 100 for discharging gas according to the present invention may be manufactured by extruding, by using an extruder, the base material of the first layer 110 which has been subjected to the foaming process, for example, a polyethylene foam, forming the fine bores 111 in the base material by needle punching, preheating, by using heated rollers, the base material of the second layer 120, for example, the polyethylene non-woven fabric base material, stacking, by using compression rollers, the base material of the first layer 110 and the base material of the second layer 120 and then partially laminating the base material of the first layer 110 and the base material of the second layer 120 by thermal bonding, and cooling the laminated base materials of the first and second layers 110 and 120.

According to the present invention, the first layer 110 and the second layer 120 are partially laminated and the packing sheet 100 may include the lamination portions 130 which are the regions in which the first layer 110 and the second layer 120 are laminated, and the gap portion 140 which is the region other than the regions of the lamination portion 130.

As illustrated in FIG. 2, the lamination portions 130 may be discontinuously formed at multiple points in the circumferential and inner regions of the laminated first and second layers 110 and 120. Alternatively, as illustrated in FIG. 3, the lamination portions 130 may be formed in the form of continuous lines formed along the circumferences of the first and second layers 110 and 120, that is, continuous lines having a predetermined thickness therein.

As illustrated in FIG. 2, in the case in which the lamination portions 130 are discontinuously formed at the multiple points, the area of the region corresponding to the gap portion 140 is relatively increased, and as a result, the gas may actively flow through the gap portion 140.

The lamination portion 130 is the portion where the first layer 110 and the second layer 120 are completely attached to each other. The lamination portion 130 serves to prevent the gas or the liquid substance in the container from being discharged. The gas may penetrate only through the gap portion 140 that corresponds to the region other than the regions of the lamination portions 130. The waterproof base material of the second layer 120 may prevent the liquid substance in the container from leaking to the outside.

The lamination portions 130 may include a sealing portion 131 formed by continuously laminating any one of the first and second layers 110 and 120 on an outer circumference of the other of the first and second layers 110 and 120. Here, in a case in which the first layer 110 and the second layer 120 have the same size, the sealing portion 131 may correspond to the circumferences of the first and second layers 110 and 120, as illustrated in FIG. 2. Since the sealing portion 131 is formed along the outer circumference of any one of the first layer 110 and the second layer 120 as described above, it is possible to prevent the liquid substance, which is included in the gap portion 140 formed adjacent to the sealing portion 131, from leaking to the outside.

Meanwhile, the gap portion 140 is the region excluding the regions of the lamination portions 130. For example, as illustrated in FIG. 2, the region of the gap portion 140 may be the entire remaining region excluding the multiple points at which the first layer 110 and the second layer 120 are laminated, or the region of the gap portion 140 may have a particular lattice pattern, as illustrated in FIG. 3.

The gap portion 140 has the space formed as the first layer 110 and the second layer 120 are spaced apart from each other, and the gas may flow and penetrate through the second layer 120 in the space. In addition, it is possible to more efficiently discharge the gas created in the container by increasing the area of the gap portion 140 or forming the fine bores 111 in the region of the first layer 110 that corresponds to the gap portion 140, considering that the gas is not discharged through the regions of the lamination portions 130.

Next, the food container 200 including the packing sheet 100 for discharging gas will be described.

Figure 5:
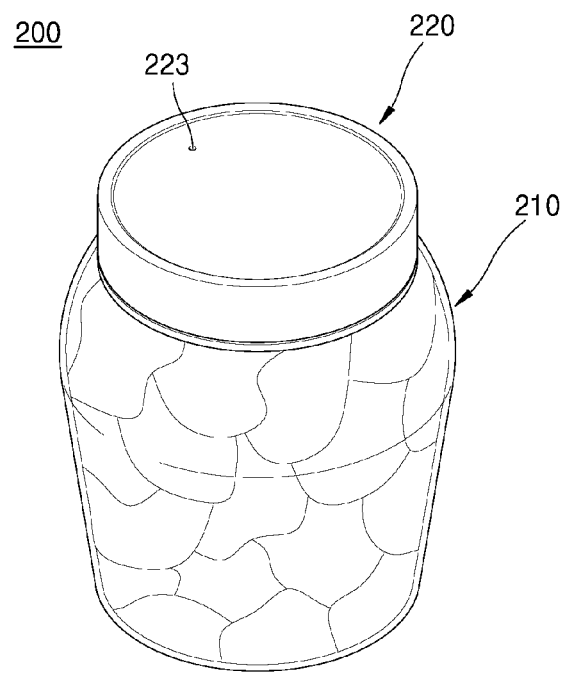
FIG. 5 is a view illustrating a food container according to the exemplary embodiment of the present invention.
Figure 6:
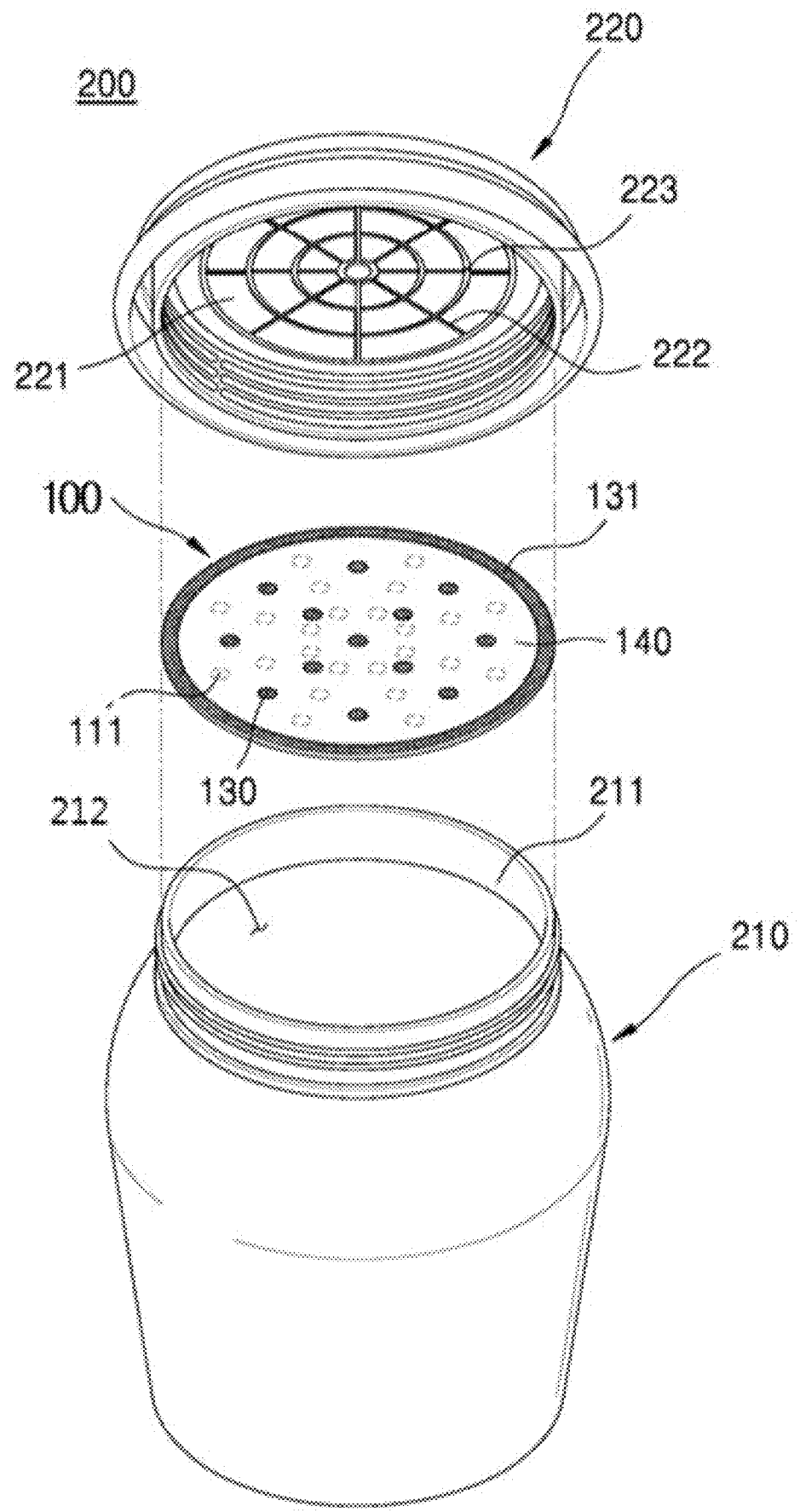
FIG. 6 is a view illustrating constituent elements of the food container to which the packing sheet for discharging gas according to the exemplary embodiment of the present invention is applied in a state in which the constituent elements are disassembled.
Figure 7:
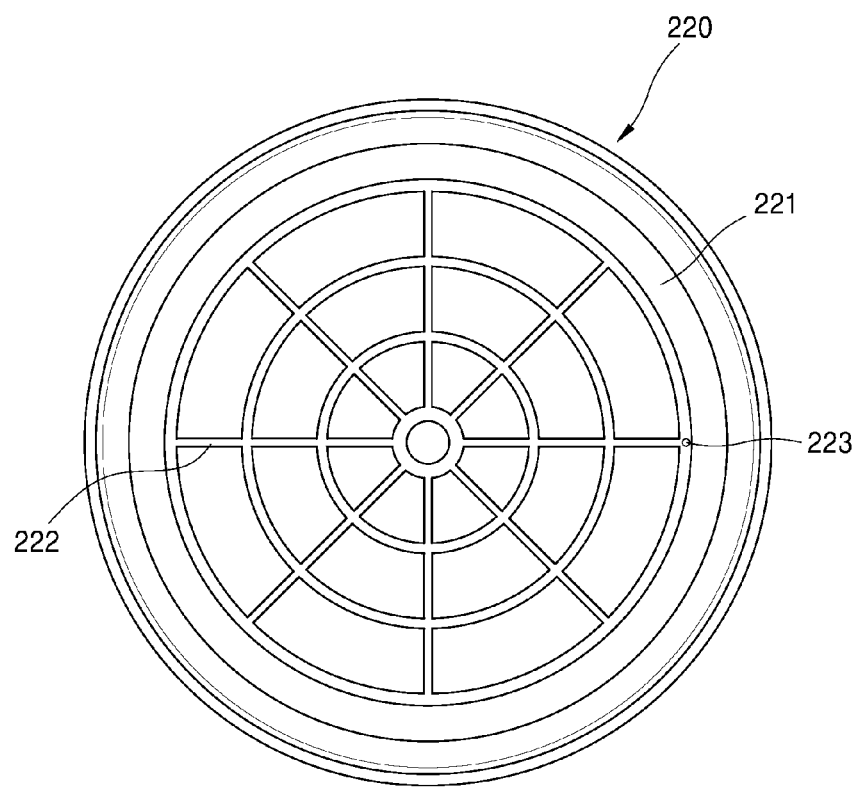
FIG. 7 is a view illustrating a bottom surface of a cover according to the exemplary embodiment of the present invention.
Figure 8:
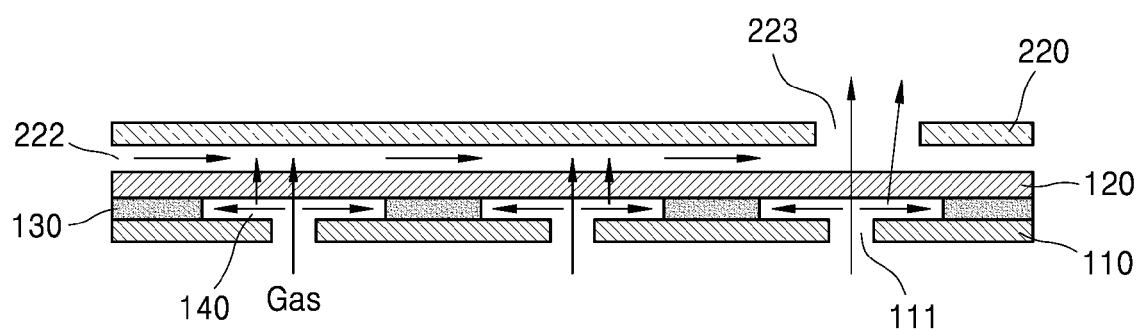
FIG. 8 is a view illustrating a movement route of gas through the food container to which the packing sheet for discharging gas according to the exemplary embodiment of the present invention is applied.
Figure 9:
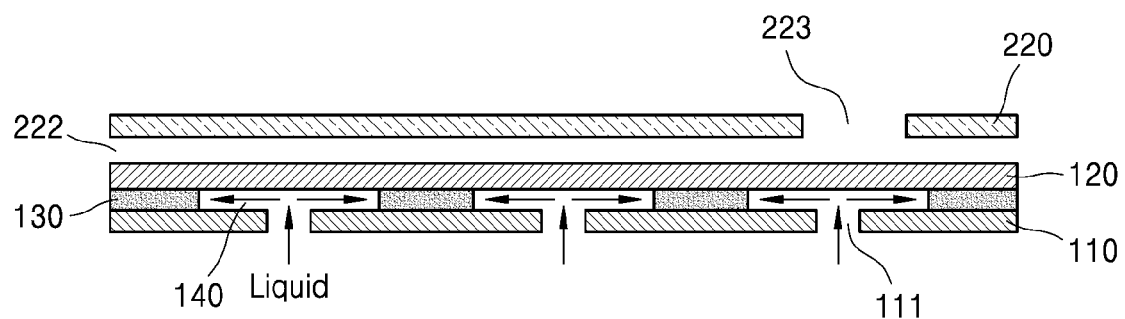
FIG. 9 is a view illustrating a movement route of a liquid substance through the food container to which the packing sheet for discharging gas according to the exemplary embodiment of the present invention is applied.

FIG. 5 is a view illustrating the food container according to the exemplary embodiment of the present invention, FIG. 6 is a view illustrating constituent elements of the food container to which the packing sheet for discharging gas according to the exemplary embodiment of the present invention is applied in a state in which the constituent elements are disassembled, FIG. 7 is a view illustrating a bottom surface of a cover according to the exemplary embodiment of the present invention, FIG. 8 is a view illustrating a movement route of gas through the food container to which the packing sheet for discharging gas according to the exemplary embodiment of the present invention is applied, and FIG. 9 is a view illustrating a movement route of a liquid substance through the food container to which the packing sheet for discharging gas according to the exemplary embodiment of the present invention is applied.

Referring to FIGS. 5 and 6, the food container 200 according to the exemplary embodiment of the present invention may include a main body 210 which has therein an accommodation space 212 for accommodating food and has an opening 211 at one side thereof, and a cover 220 which may open or close the opening 211. In addition, the cover 220 may include the packing sheet 100 for discharging gas provided on a bottom surface 221 on the cover 220, and a discharge hole 223 through which the gas, which is discharged through the packing sheet 100 for discharging gas, is discharged to the outside.

As illustrated in FIG. 6, the packing sheet 100 for discharging gas according to the exemplary embodiment of the present invention may be provided on the bottom surface 221 of the cover 220 in a state in which a bottom surface 110a of the first layer 110 is directed toward the opening 211 and an upper surface 120a of the second layer 120 is directed toward the cover 220. The packing sheet 100 for discharging gas is compressed against the opening 211 to seal the main body 210 while the cover 220 closes the opening 211, thereby discharging the gas created in the container to the outside while maintaining leakproof sealability of the food container 200. Meanwhile, the packing sheet 100 for discharging gas according to another exemplary embodiment of the present invention may also be provided on the bottom surface 221 of the cover 220 of the food container 200 so that a bottom surface 110b of the first layer 110 is directed toward the opening 211 and an upper surface 120b of the second layer 120 is directed toward the cover 220.

The food container 200 according to the exemplary embodiment of the present invention includes the packing sheet 100 for discharging gas which is provided on the bottom surface 221 of the cover 220 instead of the gas absorbent in the related art, and as a result, it is possible to reduce costs required to package products.

In addition, the cover 220 may include flow grooves 222 that extend on the bottom surface 221 so as to form flow paths of the gas, which is discharged from the packing sheet 100 for discharging gas, by cooperating with a surface of the packing sheet 100 for discharging gas which faces the cover 220. In the exemplary embodiment of the present invention, the surface of the packing sheet 100 for discharging gas, which faces the cover 220, may be the upper surface 120a of the second layer 120.

The gas, which penetrates through the packing sheet 100 for discharging gas, flows along the flow grooves 222 and may be finally discharged to the outside through the discharge hole 223. As illustrated in FIG. 7, the flow grooves 222 may be provided radially, and the flow grooves 222 may be provided in various shapes advantageous to the flow of the gas.

The discharge hole 223 formed in the cover 220 may be formed in the flow grooves 222, which are the flow paths of the gas, and thus may enable the gas, which flows along the flow grooves 222, to be immediately discharged to the outside. In addition, the discharge hole 223 may be formed at any position in the flow groove 222 so as to penetrate the cover 220. Only the single discharge hole 223 may be formed as illustrated in FIG. 7, but multiple discharge holes may be formed.

As described above, according to the packing sheet 100 for discharging gas according to the exemplary embodiment of the present invention, the space, in which the gas may flow, is formed by partially laminating the first layer 110 having the fine bores 111 and the second layer 120 made of a gas-permeable waterproof material, and as a result, it is possible to prevent a liquid leakage while smoothly discharging the gas created in the container.

The food container 200 according to the present exemplary embodiment includes the packing sheet 100 for discharging gas which is provided on the bottom surface 221 of the cover 220, and includes the flow grooves 222 and the discharge hole 223 which are formed by cooperating with the cover 220 and allow the gas to flow and to be discharged therethrough, and as a result, it is possible to prevent expansion and deformation of the container caused by the gas by efficiently discharging the gas to the outside of the container.

In the present exemplary embodiment, the structure, in which any one of the first layer 110 and the second layer 120 is continuously laminated on the outer circumference of the other of the first layer 110 and the second layer 120, may prevent the liquid substance contained in the container from leaking through a gap between the main body 210 and the cover 220.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

What is claimed is:

1. A packing sheet comprising:
   a first layer and a second layer that is stacked on the first layer,
   wherein the first layer comprise a first surface facing the second layer, and the second layer comprises a second surface facing the first layer,
   a first portion of the first surface of the first layer and a first portion of the second surface of the second layer directly contact at a lamination portion, and
   a second portion of the first surface of the first layer and a second portion of the second surface of the second layer are spaced apart from each other and define a gap portion therebetween, and gas is configured to flow in the gap portion.

2. The packing sheet of claim 1, wherein the first layer or the second layer includes a non-gas-permeable base material having a fine bore or includes a gas-permeable base material.

3. The packing sheet of claim 1, wherein the first layer includes a non-gas-permeable base material having a fine bore, and the second layer includes a gas-permeable base material.

4. The packing sheet of claim 3, wherein the non-gas-permeable base material is formed through a foaming process.

5. The packing sheet of claim 3, wherein the gas-permeable base material of the second layer has a waterproof property.

6. The packing sheet of claim 1, wherein the lamination portion includes a sealing portion which is formed by continuously laminating any one of the first layer and the second layer on an outer circumference of the other of the first layer and the second layer.

7. The packing sheet of claim 3, wherein the fine bore is in a portion of the first layer that defines the gap portion.

8. The packing sheet of claim 1, wherein the first surface of the first layer and the second surface of the second layer are parallel to each other.

9. The packing sheet of claim 1, wherein the laminated portion comprises a plurality of laminated portions spaced apart from each other.

10. The packing sheet of claim 1, wherein the laminated portion encloses the gap portion.

11. The packing sheet of claim 10, wherein a portion of the first layer defining the gap portion comprises a fine bore extending through the first layer.

12. The packing sheet of claim 3, wherein the second portion of the second surface of the second layer exposes to the gap portion.

13. A food container comprising:
   a main body comprising an accommodation space for accommodating food and an opening at one side thereof;
   a cover which is capable of opening or closing the opening; and a packing sheet for discharging gas in the main body, wherein the packing sheet is on a bottom surface of the cover, and the packing sheet has a structure in which a first layer and a second layer, which are configured such that the gas flows between one surface and another surface, when stacked, and wherein the packing sheet comprises:
- a lamination portion which is formed by partially laminating the first layer and the second layer; and
- a gap portion which is a region other than a region of the lamination portion and has a space formed between the first layer and the second layer so that the gas flows in the space, wherein the packing sheet is compressed against the opening to seal the main body while the cover closes the opening, and the packing sheet is configured to discharge the gas, and the cover includes a discharge hole through which the gas discharged through the packing sheet is configured to be discharged to the outside.

14. The food container of claim 13, wherein the cover has a flow groove that extends on a bottom surface thereof so as to form a flow path of the gas discharged from the packing sheet by cooperating with a surface of the packing sheet which faces the cover.

15. The food container of claim 14, wherein the discharge hole is in the flow groove so as to penetrate the cover.

* * * * *